United States Patent [19]

Takeya et al.

[11] Patent Number: 5,486,969
[45] Date of Patent: Jan. 23, 1996

[54] MAGNETIC HEAD CORE HAVING FERRITE MEMBER REINFORCED BY NON-MAGNETIC MATERIAL

[75] Inventors: Fuminori Takeya, Iwakura; Tomio Suzuki, Yokkaichi, both of Japan

[73] Assignee: NGK Insulators, Ltd., Japan

[21] Appl. No.: 258,836

[22] Filed: Jun. 13, 1994

[30] Foreign Application Priority Data

Jun. 28, 1993 [JP] Japan .................................. 5-185467

[51] Int. Cl.$^6$ ............................................. G11B 5/133
[52] U.S. Cl. ............................................... 360/127
[58] Field of Search ......................... 360/127, 123, 360/126

[56] References Cited

U.S. PATENT DOCUMENTS

| | | | |
|---|---|---|---|
| 4,866,555 | 9/1989 | Inagoya et al. | 360/126 |
| 4,888,658 | 12/1989 | Ono et al. | 360/127 |
| 5,043,842 | 8/1991 | Terada et al. | 360/119 |
| 5,162,960 | 11/1992 | Sakata et al. | 360/127 |
| 5,305,166 | 4/1994 | Inoue et al. | 360/103 |

FOREIGN PATENT DOCUMENTS

3-283008 12/1991 Japan .

*Primary Examiner*—John H. Wolff
*Assistant Examiner*—Adriana Giordana
*Attorney, Agent, or Firm*—Parkhurst Wendel & Rossi

[57] ABSTRACT

A magnetic head core for a magnetic head including a first and a second ferrite member butted and bonded together to form an annular, closed magnetic path around a coil-winding groove, and a coil attached to a coil-winding portion of the first ferrite member. The first and second ferrite members provide a sliding surface to which a magnetic recording medium is opposed, and which extends across the first and second ferrite members. A non-magnetic material is secured to at least one of an inner surface and an outer surface of the coil-winding portion. The non-magnetic material is located below the sliding surface, and is spaced apart from the magnetic recording medium with the sliding surface disposed between the non-magnetic material and the magnetic recording medium.

8 Claims, 8 Drawing Sheets

MAGNETIC HEAD CORE HAVING FERRITE MEMBER REINFORCED BY NON-MAGNETIC MATERIAL

BACKGROUND OF THE INVENTION

1. Field of the Invention

The present invention relates in general to a magnetic head core which includes two ferrite members forming an annular, closed magnetic circuit, and in particular to a novel structure of such a magnetic head core which assures a reduced inductance and is suitably used with a recent magnetic recording medium having a relatively high recording density.

2. Discussion of the Related Art

To meet an increasing requirement for a high recording density of a magnetic recording medium, such as a floppy disk, a magnetic disk and a magnetic tape, there has been much research and development activity particularly on a rigid magnetic disk drive which permits an increased density of information to be recorded per unit area of the magnetic recording medium, in an effort to realize a compact, high capacity and high-speed disk drive.

A type of magnetic head used with a rigid disk drive (RDD), hard disk drive (HDD), floppy disk drive (FDD) and other devices has a magnetic head core, which includes a first ferrite member and a second ferrite member butted and bonded together to form an annular, closed magnetic path having a coil-winding aperture. The magnetic head core has a disk-sliding surface to be opposed to a magnetic recording medium, which surface is formed to extend across the two ferrite members. A coil is wound around the first ferrite member of the head core.

However, the magnetic head core in which the annular, closed magnetic path is formed by the ferrite members suffers from undesirably high inductance, and cannot use high-frequency signals due to a limited resonance frequency. Thus, the known magnetic head core does not satisfy the requirement for high recording density of the magnetic recording medium.

The inductance of the magnetic head core can be effectively reduced by reducing a cross sectional area of the ferrite members forming the magnetic path, as disclosed in JP-A-3-283008 filed by the assignee of the present application. However, it is difficult to reduce the cross sectional area of the ferrite members sufficiently since the ferrite members are fragile and the head core needs to be strong enough to endure stresses applied when the coil is wound around one of the ferrite members. Thus, it is extremely difficult for the known magnetic head core to exhibit a sufficiently low inductance.

SUMMARY OF THE INVENTION

It is therefore an object of the present invention to provide a magnetic head core having a novel structure, which has a sufficiently low inductance while assuring a sufficiently high mechanical strength.

The above object may be accomplished according to the principle of the present invention, which provides a head core for a magnetic head for recording information on a magnetic recording medium, comprising: (a) a first ferrite member and a second ferrite member butted and bonded together to form an annular, closed magnetic path around a coil-winding groove, the first and second ferrite members providing a sliding surface to which the magnetic recording medium is opposed, the sliding surface extending across the first and second ferrite members; (b) a coil attached to a coil-winding portion of the first ferrite member; and (c) a non-magnetic material secured to at least one of an inner surface and an outer surface of the coil-winding portion of the first ferrite member, such that the non-magnetic material extends over the entire length of the coil-winding portion, the non-magnetic material being located below said sliding surface and being spaced apart from the magnetic recording medium by a portion of the first ferrite member which provides a part of the sliding surface.

In the magnetic head core constructed as described above according to the present invention, the coil-winding portion of the first ferrite member exhibits a sufficiently high mechanical strength due to the presence of the non-magnetic material secured to the coil-winding portion.

Accordingly, the thickness of the coil-winding portion of the first ferrite member and the cross sectional area of the corresponding portion of the magnetic path formed by the first ferrite member can be significantly reduced, assuring a sufficiently high strength of the ferrite member. Due to the reduced cross sectional area of the magnetic path, the head core of the present invention exhibits reduced inductance, which permits the magnetic head to perform high density recording on a magnetic recording medium.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
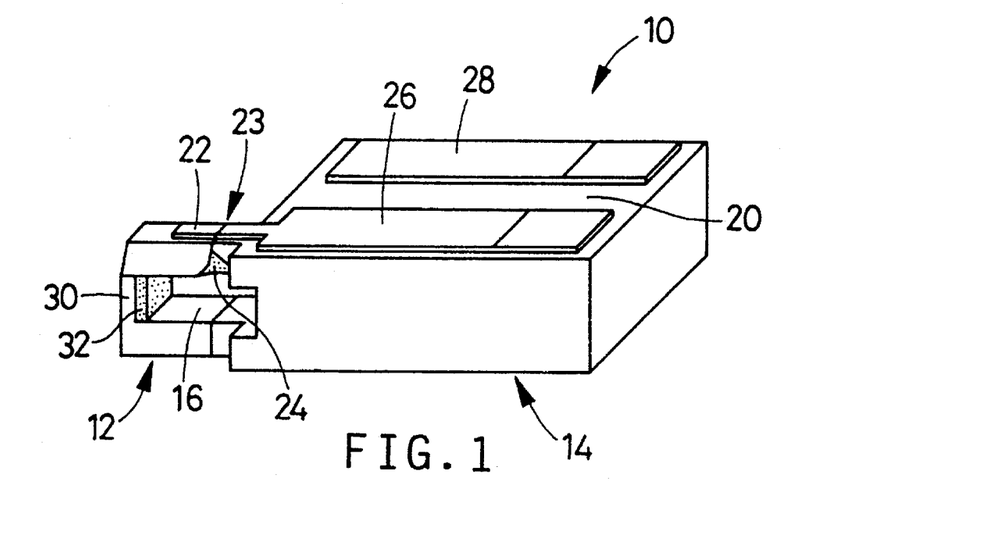
FIG. 1 is a perspective view showing a core slider of a magnetic head as one embodiment of the present invention.
Figure 2:
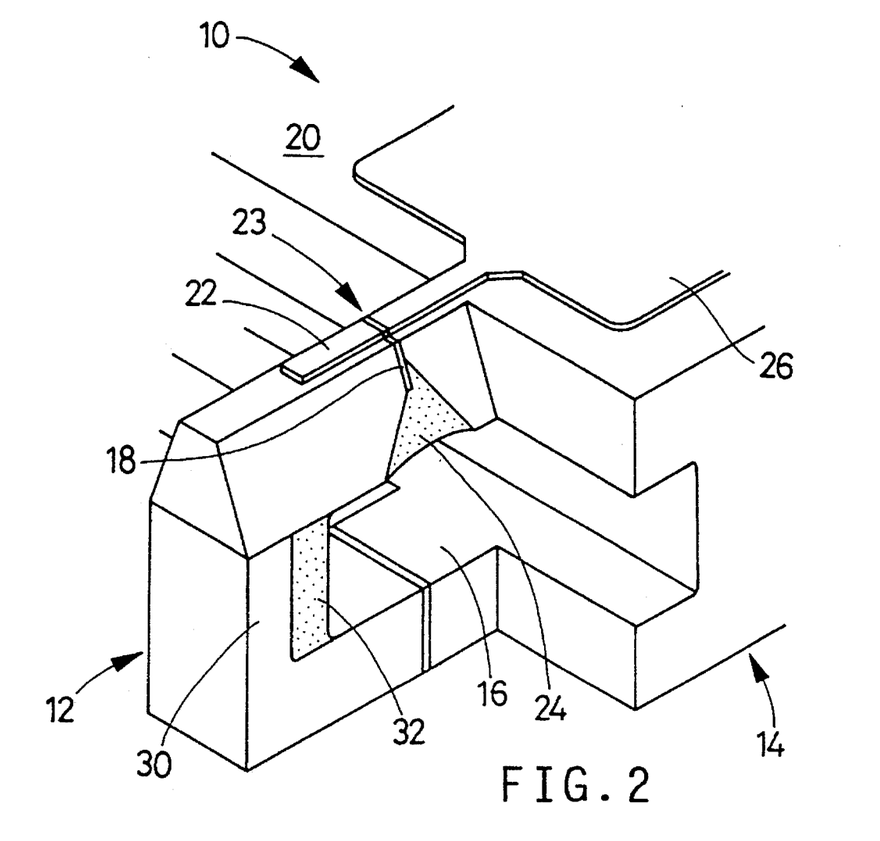
FIG. 2 is a perspective view showing in enlargement a principal part of the core slider of FIG. 1.

Referring first to FIG. 1 showing one embodiment of the present invention and FIG. 2 showing in enlargement a principal part of the embodiment, a monolithic core slider (magnetic head core) 10 used for a magnetic head for RDD (rigid disk drive) has a C-shaped first ferrite member 12 and a second ferrite member 14 in the form of a rectangular block, which are bonded together into an integral core body. Between the first and second ferrite members 12, 14, there is formed a coil-winding aperture 16 around which an annular, closed magnetic path is formed by the first and second ferrite members 10, 12.

A track portion 22 having a suitable height is formed on a top surface 20 of the core slider 10 which is to face a magnetic recording medium, so as to extend across the first and second ferrite members 12, 14. This track portion 22 provides a sliding surface on which the magnetic recording medium slides.

A thin-film like gap spacer 18 is provided between the abutting surfaces of the first and second ferrite members 12, 14, such that the gap spacer 18 provides a magnetic gap 23 which is open in the sliding surface of the track portion The first and second ferrite members 12, 14 have respective inclined surfaces located below the track portion 22, which surfaces define a predetermined depth of the magnetic gap 23. A V-shaped space or notch formed between the inclined surfaces of the abutting surfaces of the ferrite members 12, 14 is filled with a reinforcing glass 24.

A pair of air bearing portions 26, 28 having a suitable height are formed on the top surface 20 of the second ferrite member 14. One of the air bearing portions 26 is formed integrally with the track portion 22 to extend therefrom.

The first ferrite member 12 as part of the annular magnetic path has a thin-walled vertical portion 30 which serves as a coil-winding portion on which a coil (not shown) is wound. That is, the vertical portion 30 has a smaller thickness than the other portions forming the annular magnetic path. In other words, the cross sectional area of the annular magnetic path is reduced at the vertical portion 30.

The first ferrite member 12 further has a non-magnetic material 32 such as glass, which is secured to an inner circumferential surface of the vertical portion 30. The non-magnetic material 32 having a suitable thickness is formed over the entire length of the vertical portion 30. As is apparent from FIGS. 1 and 2, the non-magnetic material 32 is provided within the coil-winding aperture 16, such that the material 32 is not directly exposed to the top surface of the track portion 22 which serves as the sliding surface of the core slider 10.

The thus constructed core slider 10 is produced in the following manner, for example.

Figure 3:
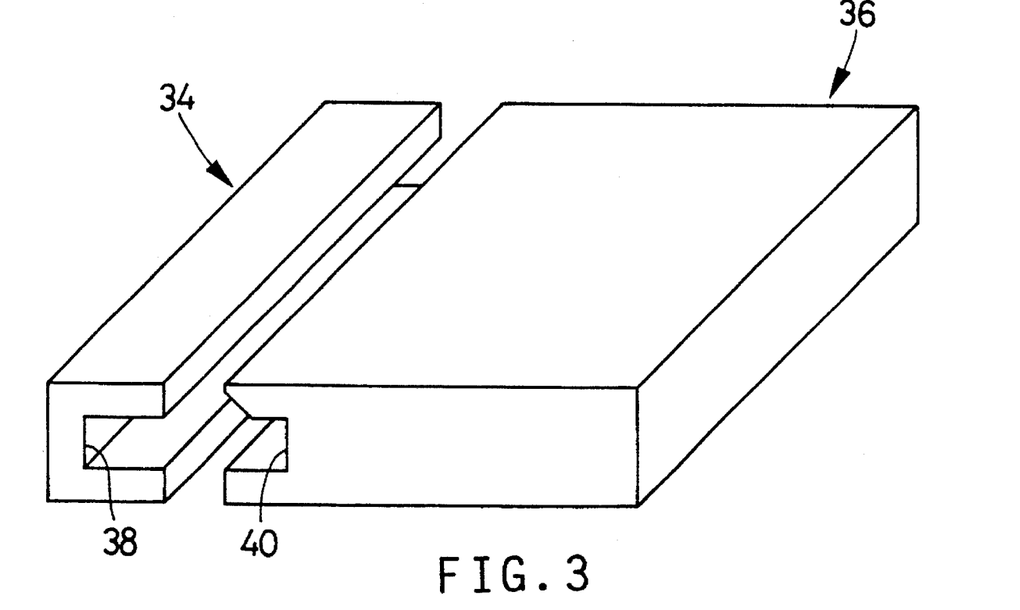
FIG. 3 is a perspective view showing a first and a second ferrite block prepared during production of the core slider of FIG. 1.

Initially, a first ferrite block 34 which gives the first ferrite member 12 and a second ferrite block 36 which gives the second ferrite member 14 are prepared, as shown in FIG. 3. Then, coil-winding grooves 38, 40 are formed by machining in respective abutting surfaces of the first and second ferrite blocks 34, 36.

The first and second ferrite or Ni—Zn blocks 34, 36 are preferably formed of a ferrite material having a high permeability, such as a single crystal of Mn—Zn ferrite.

Figure 4:
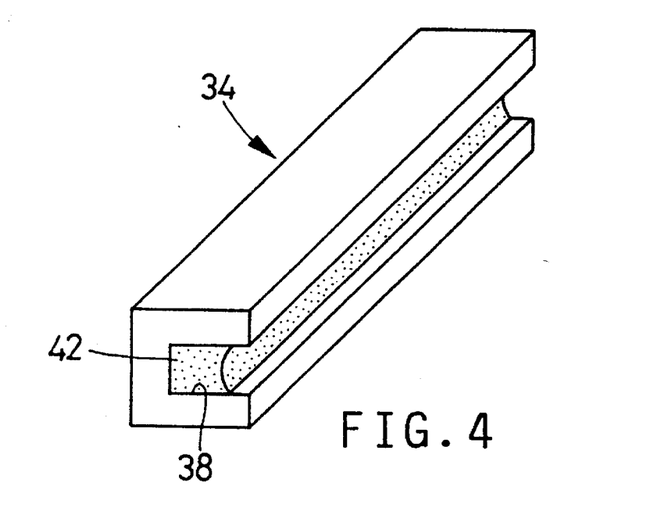
FIG. 4 is a perspective view showing a process of filing a groove in the first ferrite block with glass as a non-magnetic material.
Figure 5:
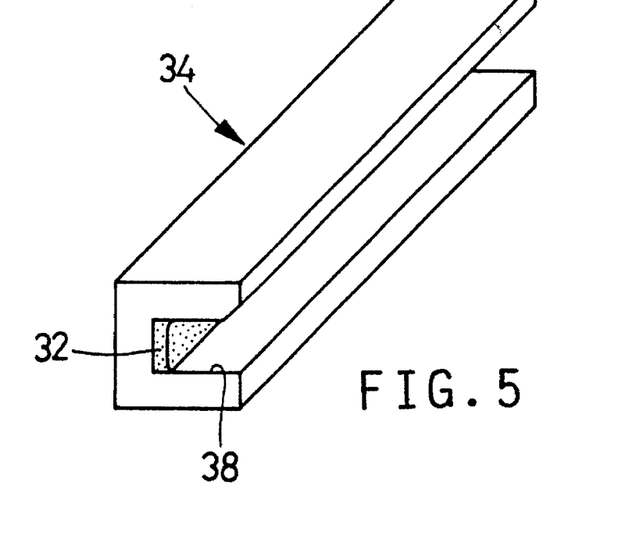
FIG. 5 is a perspective view showing a cutting process effected on the first ferrite block of FIG. 4.

Subsequently, the coil-winding groove 38 of the first ferrite block 34 is filled with a molten mass of reinforcing glass 42. Then, a portion of the reinforcing glass 42 in the groove 38 of the first ferrite block 34 is removed by cutting, whereby a glass portion 32 formed of a non-magnetic material is formed with a suitable thickness in a bottom portion of the coil-winding groove 38.

In the next step, a non-magnetic material, such as $SiO_2$ or $Al_2O_3$, is applied by sputtering or other method to at least one of the abutting surfaces of the first and second ferrite blocks 34, 36, so as to form the gap spacer 18 between the two ferrite blocks 34, 36.

Figure 6:
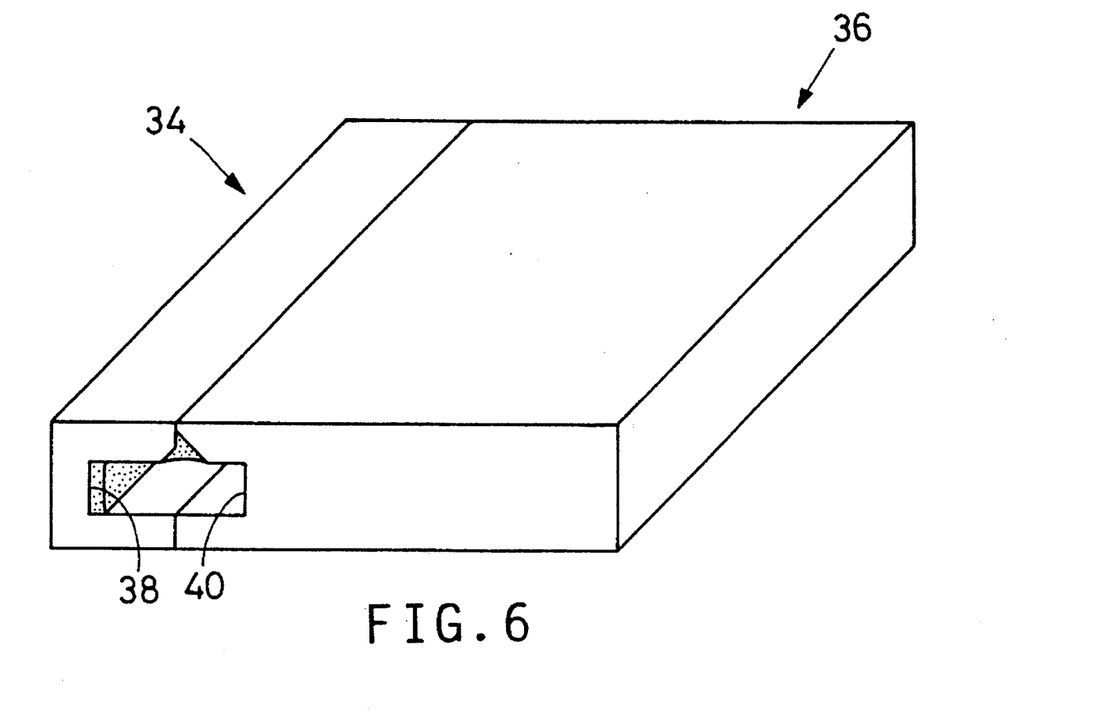
FIG. 6 is a perspective view showing a process of bonding the first and second ferrite blocks of FIG. 3 together to provide a gapped bar.

Thereafter, the first and second ferrite blocks 34, 36 are butted and bonded together. Upon or after the bonding, a molten glass is poured into a V-shaped groove or notch formed between mutually facing inclined portions of the bonding surfaces of the two ferrite blocks 34, 36. Thus, the reinforcing glass portion 24 is formed between the first and second ferrite blocks 34, 36, and a gapped bar 44 as shown in FIG. 6 is thus formed.

To avoid changes in the thickness of the glass portion 32 upon filling of a molten glass for forming the reinforcing glass portion 24, it is desirable that the reinforcing glass 42 for forming the glass portion 32 has a deformation temperature which is higher than the temperature at which the reinforcing glass is poured into the V-shaped groove between the first and second ferrite blocks 34, 36. For example, when the V-shaped groove is filled with the molten glass at a temperature of 630° C., the glass portion 32 is advantageously formed of a glass material (42) which has a deformation temperature of 635° C. and a coefficient of thermal expansion of $100 \times 10^{-7}$/°C.

Subsequently, a pattern of a photoresist is formed on the top or sliding surface of the gapped bar 44, which is then subjected to a chemical etching using an aqueous solution that contains a phosphoric acid as a major component. In this manner, the track portion 22 and air bearing portion 26, 28 are formed on the sliding surface of the gapped bar 44, as shown in FIG. 7.

Figure 7:
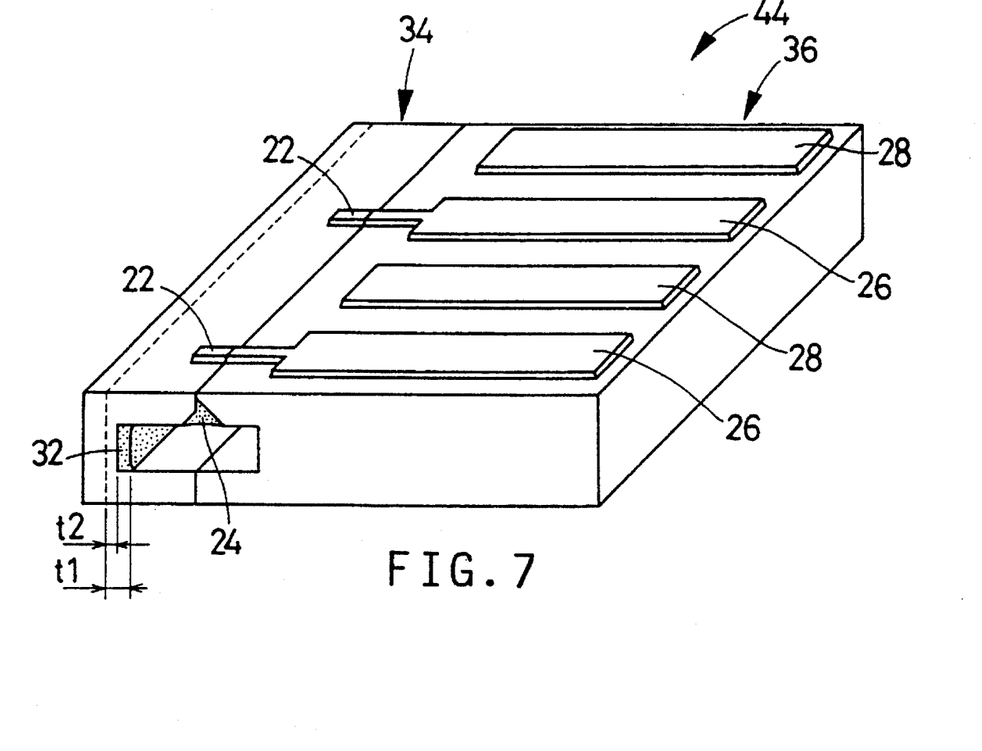
FIG. 7 is a perspective view showing a process of effecting etching on the gapped bar of FIG. 6.

After the photoresist is removed from the gapped bar 44, an end portion of the first ferrite block 34 is cut away along a broken line as shown in FIG. 7, so that the total thickness: t1 of the vertical portion 30 and glass portion 32 is controlled to a predetermined value. As a result, the vertical portion 30 of the first ferrite block 34 has a relatively small thickness t2, as compared with the other portions of the ferrite block 34.

Figure 8:
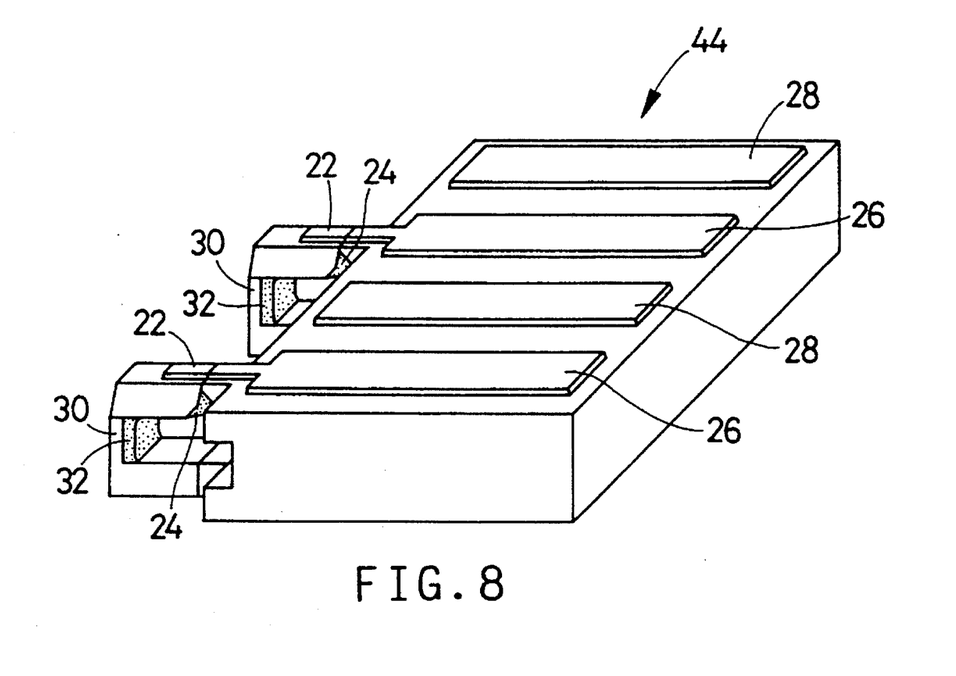
FIG. 8 is a perspective view showing a process of effecting a cutting operation on the gapped bar of FIG. 7.

In the next step, the gapped bar 44 is machined so as to form a yoke portion which corresponds to each of the track portions 22, and the yoke portion is tapered, as shown in FIG. 8. Then, the gapped bar 44 is cut in a direction perpendicular to the longitudinal direction thereof, and a desired core slider 10 as shown in FIGS. 1 and 2 is thus completed.

In the thus obtained core slider 10, the vertical portion 30 of the first ferrite member 12 on which the coil is wound is given an increased strength due to the provision of the glass portion 32 fixed to the vertical portion 30.

Accordingly, the thickness t2 of the vertical portion 30 of the first ferrite member 12 can be significantly reduced so as to reduce the cross sectional area of the corresponding vertical portion 30 of the annular magnetic path, while assuring a sufficiently high strength of the first ferrite member 12. The reduced cross sectional area of the magnetic path leads to a reduced inductance of the magnetic head core, which makes it possible for the head core to be suitably used with a magnetic recording medium having a high recording density.

In the core slider 10 as described above, the glass portion 32 is spaced apart from the track portion 22 which provides the sliding surface facing the magnetic recording medium, such that the glass portion 32 is located remote from the magnetic recording medium with the track portion 22 positioned therebetween. Since the glass portion 32 is not exposed to the surface of the track portion 22, the three dimensional shape of the track portion 22 on the side of the sliding surface can be formed by chemical etching, assuring improved efficiency with which the core slider 10 is produced.

In the core slider 10 of the instant embodiment, an edge portion of the vertical portion 30, i.e., the trailing edge of the core slider 10 is not tapered or chamfered. In this core slider 10 in which the glass portion 32 is not exposed to the surface of the track portion 22, the track portion 22 can be formed so as to protrude a suitable height from the top surface 20 of the second ferrite member 14 which faces the magnetic recording medium. With the protruding track portion 22, the edge portion of the vertical portion 30 is protected from contact with the magnetic recording medium. The elimination of the step of chamfering the edge portion also leads to improved efficiency with which the core slider 10 is produced.

There were prepared three specimens of core sliders constructed according to the instant embodiment, which have different thickness: t2 of the vertical portion 30 of the first ferrite member 12, and a comparative example of core slider which has a known structure and does not include a glass portion 32 in the vertical portion 30. The results of the measurement are indicated in TABLE 1 below.

Figure 9:
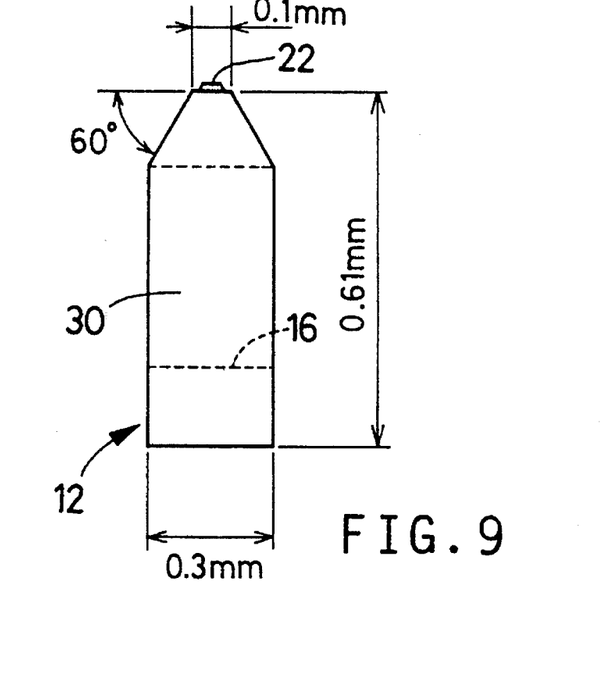
FIG. 9 is a perspective view indicating dimensions of a front face of a yoke portion of each specimen of the core slider of FIG. 1 used for measurement of the inductance and tensile strength.

For each of the core sliders thus measured, the total thickness t1 of the vertical portion 30 and glass portion 32 was controlled to 0.15 mm, and the front face of the vertical portion 30 was dimensioned as indicated in FIG. 9. The inductance of each core slider was measured by an impedance analyzer, when a voltage of 0.03 V was applied at a frequency of 1 MHz to the coil having 32 turns. The tensile strength was measured by a tensile tester of load-cell type. In the test, a thread was passed through the coil-winding aperture 16, and a tensile force required to destroy or break the core slider was measured when the force was applied to the abutting surfaces of the first and second ferrite members 12, 14 in a vertical direction at a rate of 25 mm/min, with the second ferrite member 14 fixed in position.

TABLE 1

|  | t2(mm) | Inductance(µH) | Tensile strength(g) |
| --- | --- | --- | --- |
| Present Invention | 0.10 | 3.4 | 460 |
|  | 0.060 | 3.1 | 445 |
|  | 0.035 | 3.0 | 443 |
| Comparative Example | 0.15 | 3.6 | 450 |

It will be apparent from the results as shown in TABLE 1 that the core slider of the present embodiment in which the thickness t2 of the vertical portion 30 of the first ferrite member 12 was reduced to be lower than one fourth of that of the comparative example exhibits a sufficiently high strength due to the presence of the glass portion 32, and that the reduction of the thickness t2 of the vertical portion 30 advantageously leads to reduction of the inductance.

Figure 10:
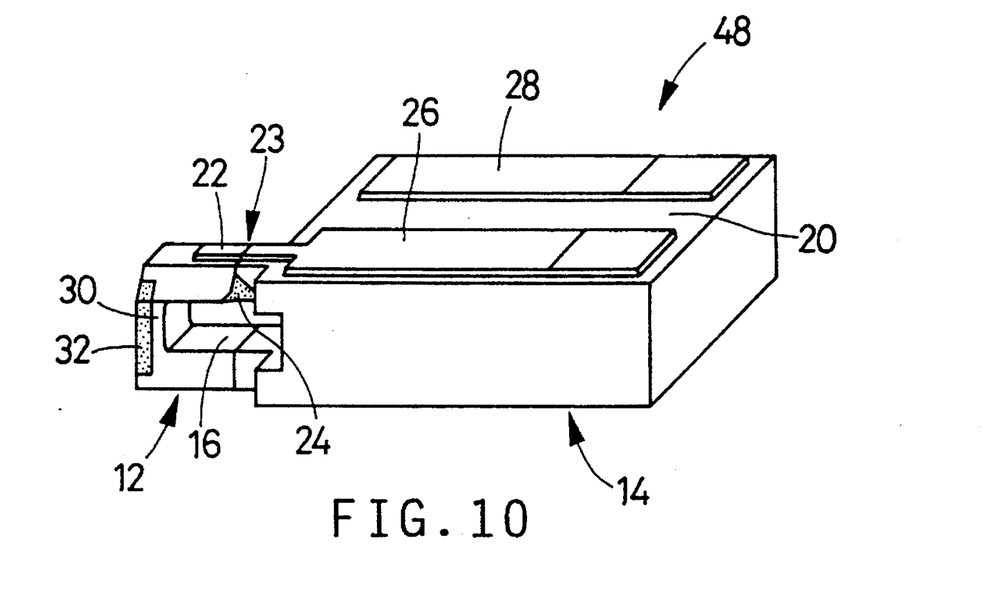
FIG. 10 is a perspective view showing a core slider as another embodiment of the present invention.

Referring next to FIG. 10, there is shown a core slider 48 as another embodiment of the present invention, which has a different structure for a yoke portion of a first ferrite member to which a non-magnetic material is secured. In FIG. 10, the same numerals as used in the first embodiment are used for identifying structurally and/or functionally corresponding elements, detailed description of which will not be provided.

In the core slider 48 of this embodiment, the non-magnetic material 32 is fixed to the outer surface of the vertical portion 30 of the first ferrite member 12 remote from the coil-winding aperture 16.

This core slider 48 is produced in the following manner, for example.

Figure 11:
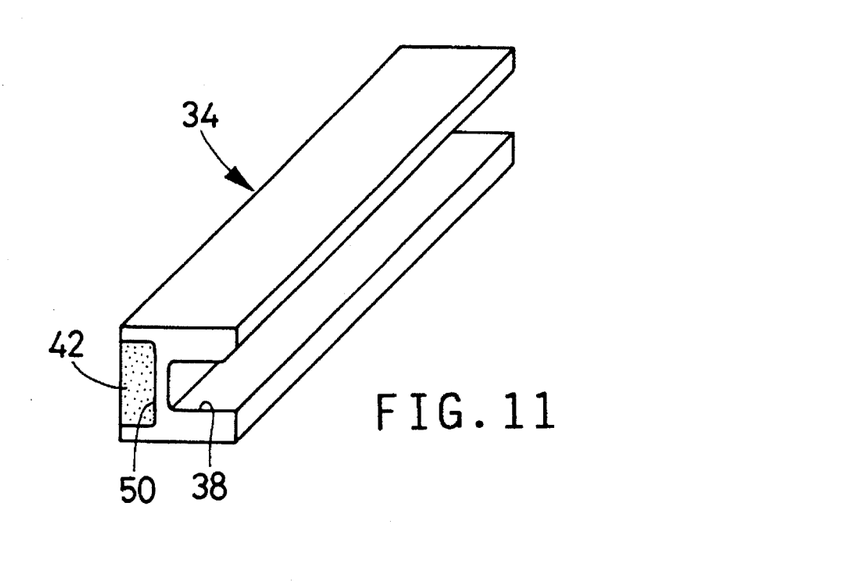
FIG. 11 is a perspective view showing a first ferrite block formed in the process of producing the core slider of FIG. 10.

Initially, a glass-filling groove 50 is formed by machining in the first ferrite block 34 which gives the first ferrite member 2, on the opposite side of the coil-winding groove 38. Then, the groove 50 is filled with a reinforcing glass 42 as the non-magnetic material. The thickness of the glass-filling groove 50 is determined depending upon the thickness of the vertical portion 30 of the first ferrite member 12.

Figure 12:
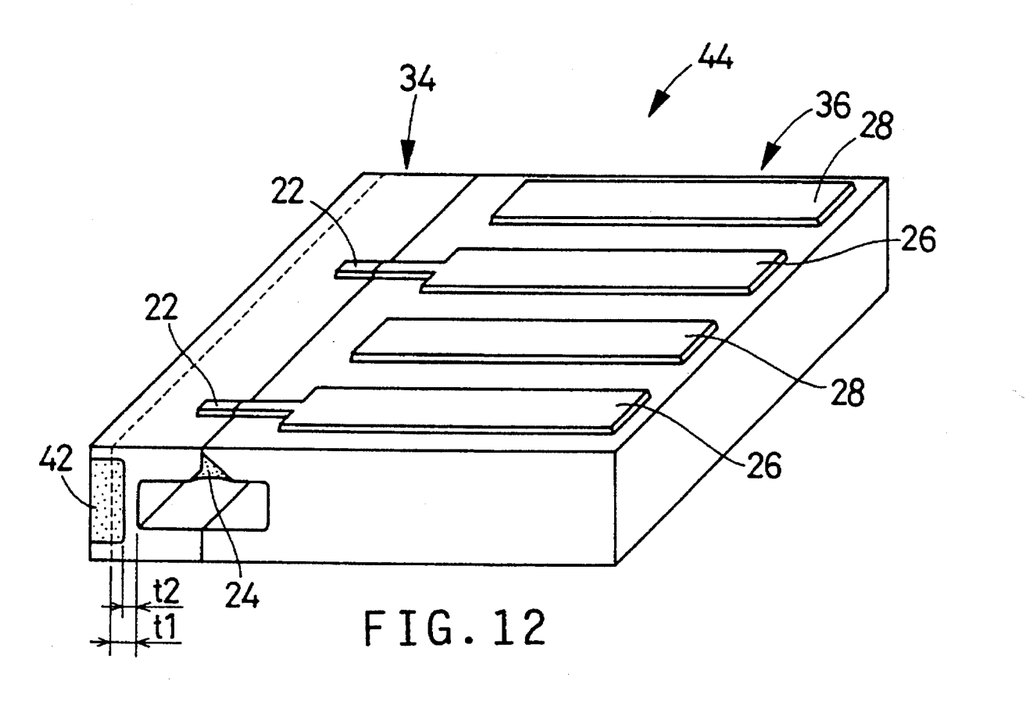
FIG. 12 is a perspective view showing a gapped bar formed in the process of producing the core slider of FIG. 10.

In the same manner as in the first embodiment, the first ferrite block 34 and the second ferrite block 36 are butted and bonded together with a gap spacer interposed between, and the V-shaped groove between the first and second ferrite blocks 34, 36 is filled with the reinforcing glass 24, so as to provide the gapped bar 44 as shown in FIG. 12. The track portion 22 and air bearing portions 26, 28 are formed by photo-etching on the sliding surface of the gapped bar 44 which is to be opposed to a magnetic recording medium.

Subsequently, an end portion of the first ferrite block 34 is cut away along a broken line as shown in FIG. 12, so that the total thickness t1 of the vertical portion 30 and glass portion 32 is controlled to a desired thickness which is determined depending upon the length of the coil wound on these portions 30, 32. Then, the yoke portions are cut out and tapered, following by a step of cutting the gapped bar 44 in a direction perpendicular to the longitudinal direction of the gapped bar 44. Thus, a desired core slider 48 is obtained.

In this core slider 48 formed by providing the glass portion 32 on the outer surface of the vertical portion 30 of the first ferrite member 12, the thickness of the vertical portion 30 can be significantly reduced while assuring a sufficiently high mechanical strength of the ferrite member 12, since the vertical portion 30 to which the coil is attached is given an increased strength due to the presence of the glass portion 32 fixed to the vertical portion 30. Thus, the cross sectional area of the annular magnetic path formed by the first ferrite member 12 can be reduced, whereby the inductance can be advantageously reduced, thus permitting the head core slider 48 to perform high density recording on a magnetic recording medium.

In the above-described process of producing the core slider 48 of the instant embodiment, the step of forming the track portion 22 and air-bearing portions 26, 28 is followed by the step of grinding or cutting the first ferrite block 34 so as to form the yoke portions. Therefore, the exposed portion of the reinforcing glass 42 is removed after the portion is exposed to an etching liquid while the track portion 22 and others are formed by chemical etching. Accordingly, the reinforcing glass 42 may be selected from a wide range of glass materials, without taking into account the deterioration of the reinforcing glass 42 by the etching liquid.

The inductance and tensile strength of the core slider of the instant embodiment were measured in the same manner as in the first embodiment. The core slider used for the measurement had the same dimensions as the specimens of the first embodiment. Further, the total thickness t1 of the vertical portion 30 and glass portion 32 and the thickness t2 of the vertical portion 30 were controlled to 0.15 mm and 0.035 mm, respectively.

As a result of the measurement, the core slider of the present embodiment exhibited an inductance of 3.1 μH and a tensile strength of 470 g. It will be understood from the measurement result that the formation of the glass portion 32 on the outer surface of the vertical portion 30 provides the same effects, that is, sufficiently low inductance and high mechanical strength, as provided by the formation of the glass portion 32 on the inner surface of the vertical portion 30.

Figure 13:
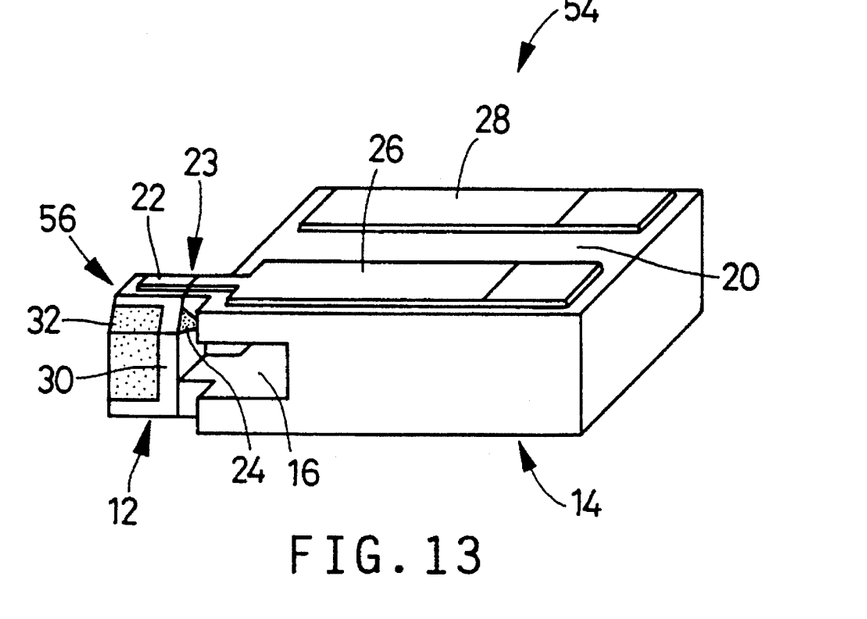
FIG. 13 is a perspective view showing a core slider as a further embodiment of the present invention.

Referring next to FIG. 13, there is shown a core slider 54 as a further embodiment of the present invention, which has a different structure of a yoke portion of a first ferrite member to which a non-magnetic material is secured. In FIG. 13, the same numerals as used in the first embodiment are used for identifying structurally and/or functionally corresponding elements, detailed description of which will not be provided.

In the core slider 54 of the present embodiment, a coil-winding groove is not formed in the abutting surface of the first ferrite member 12 which is bonded to the second ferrite member 14. Further, the non-magnetic material 32 is secured to the outer surface of the vertical portion 30 of the first ferrite member 12 remote from the coil-winding aperture 16.

The thus constructed core slider 54 is produced in the following manner, for example.

Figure 14:
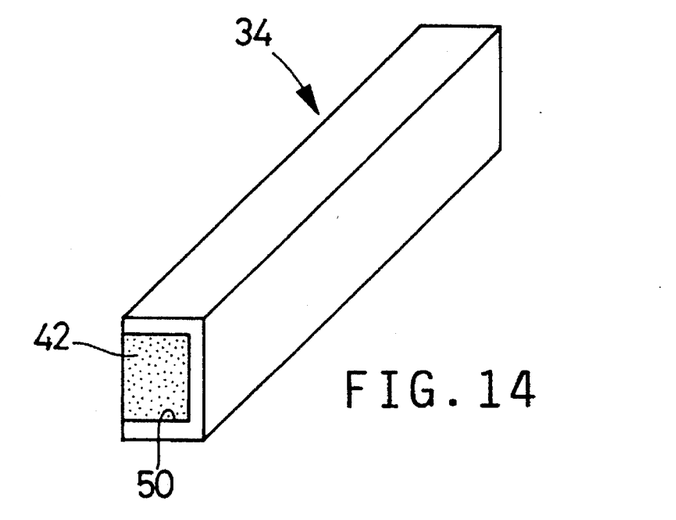
FIG. 14 is a perspective view showing a first ferrite block formed in the process of producing the core slider of FIG. 13.

Initially, only the glass-filling groove 50 is formed by machining in the first ferrite block 34 which gives the first ferrite member 12, as shown in FIG. 14, without forming a coil-winding groove in the first ferrite block 34. Then, the groove 50 is filled with a glass 42 as the non-magnetic material. The thickness of the vertical portion 30 of the first ferrite member 12 is determined by the depth of the glass-filling groove 50 formed in the ferrite block 34.

Figure 15:
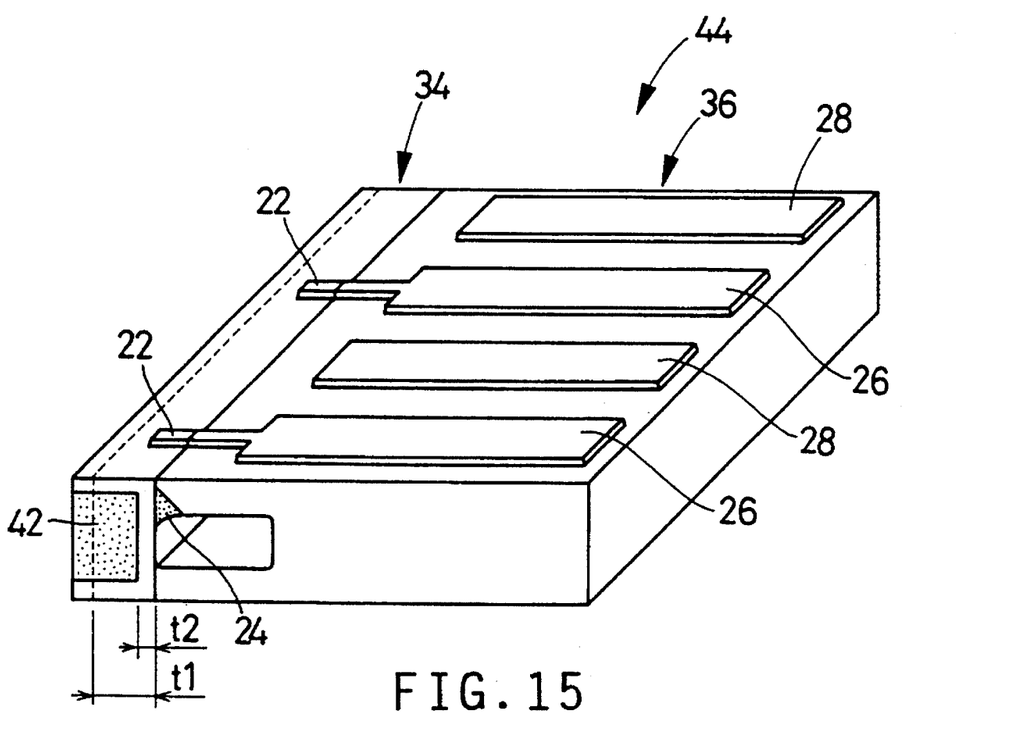
FIG. 15 is a perspective view showing a gapped bar formed in the process of producing the core slider of FIG. 13.

In the same manner as in the first embodiment, the first ferrite block 34 and the second ferrite block 36 are butted and bonded together with a gap spacer interposed between, and the V-shaped groove between the first and second ferrite blocks 34, 36 is filled with the reinforcing glass 24, so as to provide the gapped bar 44 as shown in FIG. 15. The track portion 22 and air bearing portions 26, 28 are formed by photo-etching on the sliding surface of the gapped bar 44 which is to be opposed to a magnetic recording medium.

Subsequently, an end portion of the first ferrite block 34 is cut away along a broken line as shown in FIG. 15, so that the total thickness t1 of the vertical portion 30 and the glass portion 32 formed of the non-magnetic material is controlled to a desired thickness which is determined depending upon the length of the coil attached to these portions 30, 32. Then, the yoke portions are cut out and tapered, followed by a step of cutting the gapped bar 44 in a direction perpendicular to the longitudinal direction of the gapped bar 44. Thus, a desired core slider 54 is obtained.

In the core slider 54 of the instant embodiment constructed as described above, the vertical portion 30 of the first ferrite member 12 has a significantly reduced thickness and the glass portion 32 is fixed to the vertical portion 30. Therefore, the core slider 54 provides the same effects as provided by the core sliders 10, 48 of the first and second embodiments.

In addition, the core slider 54 of the instant embodiment is constructed such that a coil-winding groove is not formed in the bonding surface of the first ferrite member 12 facing the second ferrite member 14. In this arrangement, the vertical portion 30 is located close to the magnetic gap 23 formed between the bonding surfaces of the first and second ferrite members 12, 14, whereby the closed magnetic path partially defined by the vertical portion 30 has a further reduced inductance.

The inductance and tensile strength of the core slider of the instant embodiment were measured in the same manner as in the first embodiment. The core slider used for the measurement had the same dimensions as the specimens of the first embodiment. Further, the total thickness t1 of the vertical portion 30 and glass portion 32 and the thickness t2 of the vertical portion 30 were controlled to 0.2 mm and 0.035 mm, respectively.

As a result of the measurement, the core slider of the present embodiment exhibited an inductance of 2.6 μH and a tensile strength of 460 g. It was thus confirmed that the instant core slider 54 in which the coil-winding groove is not formed in the first ferrite member 12 exhibits a further reduced inductance as compared with the core sliders of the first and second embodiments.

While the present invention has been described in its preferred embodiments, for illustrative purpose only, it is to be understood that the present invention is by no means limited to the details of the illustrated embodiments.

The core sliders 10, 48, 54 of the illustrated embodiments are constructed such that the non-magnetic material 32 is not exposed to the top surface 20 of the second ferrite member 14 which is to be opposed to a magnetic recording medium. However, the non-magnetic material 32 may be exposed to a portion of the top surface 20 other than the sliding surface of the track portion 22 on which the magnetic medium slides, provided the non-magnetic material 32 is not exposed to the sliding surface of the track portion 22. In this case, too, the core slider provides the above-described effects to be offered by the present invention.

It is also possible to provide a non-magnetic material on each of the inner and outer surfaces of the vertical portion 30 of the first ferrite member 12.

Further, the method of producing the magnetic head core according to the present invention is not limited to those as described above in relation with the illustrated embodiments.

The present invention is applicable to a magnetic head core or core chip used in a composite-type core slider. While the present invention is applied to a core slider or head core used in a magnetic head for RDD (rigid disk drive), the invention is equally applicable to head cores used in magnetic heads for VTR (video tape recorder), FDD (floppy disk drive), DAT (digital audio tape recorder) and the like.

It is to be also understood that the present invention may be embodied with various changes, modifications and improvements, which may occur to those skilled in the art, without departing from the spirit and scope of the invention as defined in the following claims.

What is claimed is:

1. A head core for a magnetic head for recording information on a magnetic recording medium, comprising:

a first ferrite member and a second ferrite member butted and bonded together to form an annular, closed magnetic path around a coil-winding groove, upper portions of said first and second ferrite members providing a sliding surface to which the magnetic recording medium is opposed, said sliding surface extending across the first and second ferrite members in a direction in which said recording medium slides;

a coil attached to a coil-winding portion of said first ferrite member; and a non-magnetic material secured to at least one of an inner surface and an outer surface of said coil-winding portion of said first ferrite member and spaced from said second ferrite member, said inner and outer surfaces being opposed to one another in said direction, such that said non-magnetic material extends over the entire length of said coil-winding portion, said non-magnetic material being spaced below said sliding surface apart from the magnetic recording medium by a portion of said first ferrite member which provides a part of said sliding surface.

2. A magnetic head core according to claim 1, wherein said coil-winding portion has a smaller thickness, when measured along said direction, than the other portions of said first ferrite member.

3. A magnetic head core according to claim 1, wherein said coil-winding groove is formed in said first and second ferrite members, and said coil-winding portion consists of a vertical portion of said first ferrite member arranged substantially perpendicular to said sliding surface, which vertical portion partially defines said coil-winding groove.

4. A magnetic head core according to claim 3, wherein said non-magnetic material is secured to an inner surface of said vertical portion as said inner surface of said coil-winding portion.

5. A magnetic head core according to claim 3, wherein a glass-filling groove is formed in an outer surface of said first ferrite member remote from said coil-winding groove, and said non-magnetic material is secured to an outer surface of said vertical portion as said outer surface of said coil-winding portion, so as to fill said glass-filling groove.

6. A magnetic head core according to claim 1, wherein said coil winding groove is formed in said second ferrite member and is partially defined by a vertical portion of said first ferrite member as said coil-winding portion, said vertical portion being arranged substantially perpendicular to said sliding surface, and wherein a glass-filling groove is formed in an outer surface of said first ferrite member remote from said coil-winding groove, said non-magnetic material being secured to an outer surface of said vertical portion as said outer surface of said coil-winding portion, so as to fill said glass-filling groove.

7. A magnetic head core according to claim 1, wherein said upper portions of said first and second ferrite members include a track portion which protrudes above and extends across the first and second ferrite members, wherein an uppermost surface of said track portion provides said sliding surface.

8. A magnetic head core according to claim 1, wherein said first and second ferrite members are formed of one of a single crystal of Mn—Zn ferrite and a single crystal of Ni—Zn ferrite.

* * * * *